(12) United States Patent
Yamauchi

(10) Patent No.: US 11,431,899 B2
(45) Date of Patent: Aug. 30, 2022

(54) DISPLAY METHOD AND DISPLAY APPARATUS

(71) Applicant: SEIKO EPSON CORPORATION, Tokyo (JP)

(72) Inventor: Taisuke Yamauchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 16/807,540

(22) Filed: Mar. 3, 2020

(65) Prior Publication Data
US 2020/0288057 A1 Sep. 10, 2020

(30) Foreign Application Priority Data

Mar. 4, 2019 (JP) .............................. JP2019-038289

(51) Int. Cl.
*H04N 5/232* (2006.01)
*H04N 9/31* (2006.01)
*H04N 5/225* (2006.01)
*G06V 20/80* (2022.01)

(52) U.S. Cl.
CPC ......... *H04N 5/23229* (2013.01); *G06V 20/80* (2022.01); *H04N 5/2252* (2013.01); *H04N 5/232939* (2018.08); *H04N 9/3141* (2013.01)

(58) Field of Classification Search
None
See application file for complete search history.

(56) References Cited

U.S. PATENT DOCUMENTS

| 8,482,539 | B2 | 7/2013 | Ogawa et al. | |
|---|---|---|---|---|
| 2011/0242060 | A1* | 10/2011 | McGibney | G06F 3/0425 345/179 |
| 2012/0206344 | A1* | 8/2012 | Hill | G06F 3/0428 345/157 |
| 2012/0319941 | A1* | 12/2012 | Wheatley | G06F 3/017 345/156 |
| 2013/0120252 | A1* | 5/2013 | Lam | G06F 3/0416 345/157 |
| 2013/0265228 | A1* | 10/2013 | Tamura | G06F 3/0425 345/157 |

(Continued)

FOREIGN PATENT DOCUMENTS

| JP | 2005-165981 A | 6/2005 |
|---|---|---|
| JP | 2011-145763 A | 7/2011 |

(Continued)

*Primary Examiner* — Cynthia Segura
(74) *Attorney, Agent, or Firm* — Dority & Manning, P.A.

(57) ABSTRACT

A display method includes acquiring captured image data generated by capturing an image of a second area containing a first area, the captured image data containing first partial data representing an image of the first area and second partial data representing an image of the second area, recognizing an object located in the first area by using the first partial data with no use of the second partial data, displaying a first image that underwent a first process according to the position of the object when the object is recognized as a first pointing element and when the object moves from the first area onto a display surface, and displaying a second image that underwent a second process according to the position of the object when the object is recognized as a second pointing element and when the object moves from the first area onto the display surface.

7 Claims, 4 Drawing Sheets

(56) References Cited

U.S. PATENT DOCUMENTS

| | | | | |
|---|---|---|---|---|
| 2014/0137015 A1* | 5/2014 | Gurtler | ............... | G06F 3/03542 |
| | | | | 715/765 |
| 2015/0123899 A1* | 5/2015 | Taylor | ................... | G06F 3/0304 |
| | | | | 345/157 |
| 2015/0204979 A1* | 7/2015 | Naess | ................... | G06F 3/0425 |
| | | | | 356/614 |
| 2015/0373283 A1* | 12/2015 | Hayashi | ............. | G06K 9/00355 |
| | | | | 348/239 |
| 2016/0085441 A1* | 3/2016 | Mitchell | ............ | G06F 3/04817 |
| | | | | 715/765 |
| 2016/0286191 A1* | 9/2016 | Henninen | ............ | H04N 9/3194 |
| 2018/0061372 A1* | 3/2018 | Ano | ...................... | G06F 3/1423 |
| 2018/0120960 A1* | 5/2018 | Uchiyama | ............. | G06F 3/0386 |

FOREIGN PATENT DOCUMENTS

| JP | 2012-128762 A | 7/2012 |
|---|---|---|
| JP | 2014-238828 A | 12/2014 |
| JP | 2016-164704 A | 9/2016 |

\* cited by examiner

| TYPE OF OBJECT P | PROCESS |
|---|---|
| FIRST WRITING TOOL | DRAW BLACK LINE |
| ERASER | ERASE PROJECTED LINE |
| ⋮ | ⋮ |

DISPLAY METHOD AND DISPLAY APPARATUS

The present application is based on, and claims priority from JP Application Serial Number 2019-038289, filed Mar. 4, 2019, the disclosure of which is hereby incorporated by reference herein in its entirety.

BACKGROUND

1. Technical Field

The present disclosure relates to a display method and a display apparatus.

2. Related Art

JP-A-2016-164704 describes an image display apparatus that causes a digital camera to capture an image of a pointing element on a display surface on which an image is displayed to generate captured image data, analyzes the captured image data to evaluate the pointing element, and performs drawing based on the result of the evaluation.

The image display apparatus described in JP-A-2016-164704 needs to use the entire captured image data for the evaluation of the pointing element and therefore handles a large processing load.

SUMMARY

An aspect of a display method according to the present disclosure is a display method carried out by a display apparatus, the method including acquiring captured image data generated by capturing an image of a second area containing a first area, the captured image data containing first partial data representing an image of the first area and second partial data representing an image of an area of the second area that is an area different from the first area, recognizing an object located in the first area by using the first partial data with no use of the second partial data, displaying a first image that underwent a first process on a display surface in a portion thereof according to a position of the object on the display surface when the object is recognized as a first pointing element having a first function and when the object moves from the first area onto the display surface, the first process associated with the first function, and displaying a second image that underwent a second process different from the first process on the display surface in a portion thereof according to the position of the object on the display surface when the object is recognized as a second pointing element having a second function different from the first function and when the object moves from the first area onto the display surface, the second process associated with the second function.

An aspect of a display apparatus according to the present disclosure includes a display section that displays an image on a display surface, an acquirer that acquires captured image data generated by capturing an image of a second area containing a first area, the captured image data containing first partial data representing an image of the first area and second partial data representing an image of an area of the second area that is an area different from the first area, a recognizer that recognizes an object located in the first area by using the first partial data with no use of the second partial data, and a display controller that controls the display section based on a result of the recognition performed by the recognizer, and the display controller controls the display section to cause the display section to display a first image that underwent a first process on the display surface in a portion thereof according to a position of the object on the display surface when the object is recognized as a first pointing element having a first function and when the object moves from the first area onto the display surface, the first process associated with the first function, and controls the display section to cause the display section to display a second image that underwent a second process different from the first process on the display surface in a portion thereof according to the position of the object on the display surface when the object is recognized as a second pointing element having a second function different from the first function and when the object moves from the first area onto the display surface, the second process associated with the second function.

DESCRIPTION OF EXEMPLARY EMBODIMENTS

A: First Embodiment

A1: Overview of Projector System 1000

Figure 1:
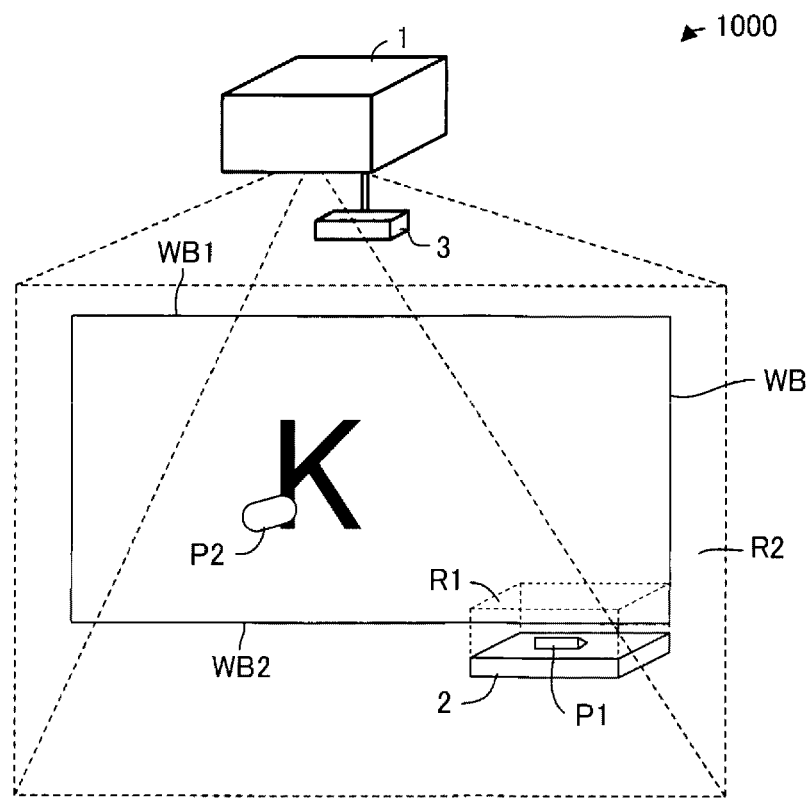
FIG. 1 shows a projector system.

FIG. 1 shows a projector system 1000 including a projector 1 according to a first embodiment. The projector system 1000 includes the projector 1, a tray 2, and a light output apparatus 3.

The projector 1 is installed on a wall above or obliquely above an upper end WB1 of a whiteboard WB. The projector 1 may not be installed on a wall and may be placed, for example, on a desk, a table, or a floor or may be hung from a ceiling.

The projector 1 projects an image on the whiteboard WB to display the image on the whiteboard WB. The projector 1 is an example of a display apparatus. The display apparatus is not limited to the projector 1 and may, for example, be a flat panel display (FPD), such as a liquid crystal display, a plasma display, and an organic electro-luminescence (EL) display. Further, the display apparatus is not limited to an FPD and may be a display of any other type.

The projector 1 has an interactive function of performing a user's input operation based on the position of an object P on the whiteboard WB. FIG. 1 shows, as the object P, a black pen P1 for writing a black line and a whiteboard eraser P2. The whiteboard eraser P2 is also referred to as a whiteboard erasing element. The black pen P1 for writing a black line is hereinafter referred to as a "black pen P1." The object P is not limited to the combination of the black pen P1 and the whiteboard eraser P2 and may instead, for example, be a red pen for writing a red line or a magnet that fixes a paper sheet or any other object onto the whiteboard WB. The object P is also referred to as a pointing element that points at a position on the whiteboard WB.

The projector 1 uses the interactive function to project on the whiteboard WB a line according to the trajectory of the object P on the whiteboard WB or erase part of the line projected on the whiteboard WB in accordance with the position of the object P on the whiteboard WB.

The whiteboard WB is an example of a display surface. The display surface is not limited to the whiteboard WB and may, for example, be a screen, a wall, a ceiling, a product, or a door.

The tray 2 is a stand on which the object P is placed. The stand on which the object P is placed is not limited to the plate-shaped tray 2 shown in FIG. 1 by way of example and may instead, for example, be an edged container. The tray 2 is an example of a support that supports the object P. The support is not limited to the tray 2 and may instead, for example, be a hook from which the object P is hung. The tray 2 is fixed, for example, to the wall below a lower end WB2 of the whiteboard WB. The position of the tray 2 is not limited to a position below the lower end WB2 of the whiteboard WB and may instead, for example, be a sideways position next to the whiteboard WB. The tray 2 may still instead be provided at part of the whiteboard WB, for example, the lower end WB2 of the whiteboard WB.

When the tray 2 supports the object P, the area where the object P is located is used as a recognition area R1. The recognition area R1 is an area where the object P is recognized and an example of a first area. The object P placed on the tray 2 can be located in the recognition area R1 without being supported by the user.

The projector 1 uses captured image data generated by capturing an image of an imaging area R2 containing the recognition area R1 to recognize the object P located in the recognition area R1. The imaging area R2 is an example of a second area. The imaging area R2 contains the whiteboard WB.

The object P placed on the tray 2 can be located in the recognition area R1 without being supported by the user, as described above. The object P located in the recognition area R1 is therefore so expressed by the captured image data, for example, that part of the object P is not hidden by a hand of the user who supports the object P. The projector 1 recognizes the object P by using the captured image data and therefore readily recognizes the object P as compared with a configuration in which captured image data representing the object P part of which is hidden, for example, by the user's hand is used to recognize the object P.

The projector 1 recognizes the object P based on partial data representing an image of the recognition area R1 out of the captured image data. The amount of captured image data used to recognize the object P can therefore be reduced as compared with a configuration in which entire captured image data is used to recognize the object P. A processing load required to recognize the object P can therefore be reduced.

The light output apparatus 3 is installed in a position above the upper end WB1 of the whiteboard WB. The light output apparatus 3 outputs planar infrared light in a downward direction.

A2. Example of Light Output Apparatus 3

Figure 2:
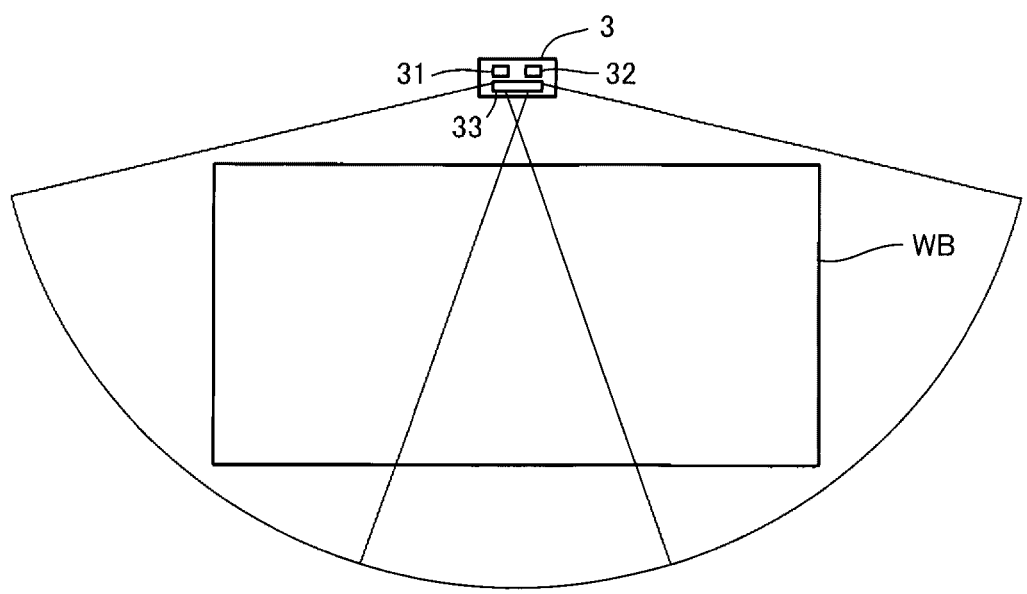
FIG. 2 shows an example of a light output apparatus.

FIG. 2 shows an example of the light output apparatus 3. The light output apparatus 3 includes a first light output section 31, a second light output section 32, and an optical apparatus 33. The first light output section 31 and the second light output section 32 are each a laser diode (LD) that outputs infrared light. The first light output section 31 and the second light output section 32 are each not limited to an LD and may instead each be a light emitting diode (LED) that outputs infrared light. The first light output section 31 is installed on the left when the whiteboard WB is viewed from the front, and the second light output section 32 is installed on the right when the whiteboard WB is viewed from the front. The number of light output sections provided in the light output apparatus 3 is not limited to two and only needs to be one or more. The optical apparatus 33 diffuses the infrared light outputted from each of the first light output section 31 and the second light output section 32 into planar light along the whiteboard WB.

The projector 1 evaluates whether or not the object P has touched the whiteboard WB based on part of the infrared light outputted from the light output apparatus 3, that is, reflected light reflected off the object P on the whiteboard WB.

A3. Example of Projector 1

Figure 3:
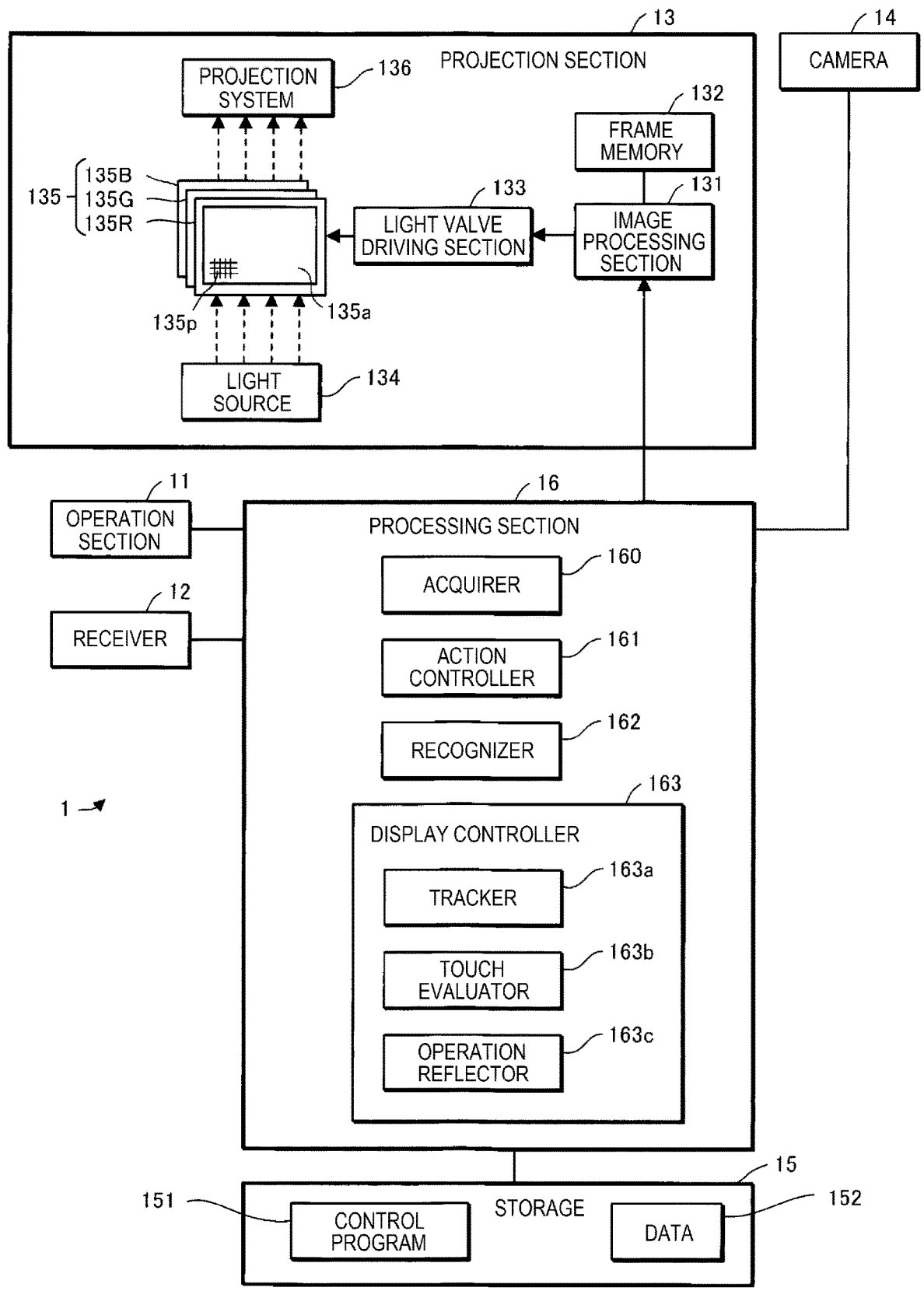
FIG. 3 shows an example of a projector.

FIG. 3 shows an example of the projector 1. The projector 1 includes an operation section 11, a receiver 12, a projection section 13, a camera 14, a storage 15, and a processing section 16.

The operation section 11 is, for example, a variety of operation buttons or operation keys or a touch panel. The operation section 11 is provided as part of an enclosure of the projector 1. The operation section 11 receives the user's input operation.

The receiver 12 receives information based on input operation performed on a remote control that is not shown wirelessly from the remote control. The remote control includes a variety of operation buttons or operation keys or a touch panel that receives input operation. The receiver 12 may receive input of operation performed on an application program running on an information processing apparatus, such as a smartphone, wirelessly from the information processing apparatus.

The projection section 13 projects an image on the whiteboard WB to display the image on the whiteboard WB. The projection section 13 is an example of a display section. The projection section 13 includes an image processing section 131, a frame memory 132, a light valve driving section 133, a light source 134, a red liquid crystal light valve 135R, a green liquid crystal light valve 135G, a blue liquid crystal light valve 135B, and a projection system 136. When the red liquid crystal light valve 135R, the green liquid crystal light valve 135G, the blue liquid crystal light valve 135B do not need to be distinguished from one another, the three liquid crystal light valves are referred to as "liquid crystal light valves 135."

The image processing section 131 is formed of a circuit, such as one or more image processors. The image processing section 131 receives image data, for example, from the processing section 16. The image processing section 131 may receive image data from an image supplying apparatus that is not shown. The image supplying apparatus is, for example, a personal computer (PC). The image supplying apparatus is not limited to a PC and may instead, for example, be a tablet terminal, a smartphone, a video reproduction apparatus, a digital versatile disc (DVD) player, a Blu-ray disc player, a hard disk recorder, a television tuner apparatus, or a video game console.

The image processing section 131 develops the image data in the frame memory 132. The frame memory 132 is formed, for example, of a circuit, such as an integrated circuit (IC), or a storage device, such as a random access memory (RAM). The image processing section 131 performs image processing on the image data developed in the frame memory 132 to generate an image signal.

The image processing performed by the image processing section 131 includes, for example, resolution conversion. In the resolution conversion, the image processing section 131 converts the resolution of the image data, for example, into the resolution of the liquid crystal light valves 135. The image processing section 131 may perform other types of image processing, such as gamma correction, in addition to the resolution conversion.

The light valve driving section 133 is formed, for example, of a circuit, such as a driver. The light valve driving section 133 drives the liquid crystal light valves 135 based on the image signal provided from the image processing section 131.

The light source 134 is, for example, an LED. The light source 134 is not limited to an LED and may instead, for example, be a xenon lamp, an ultrahigh-pressure mercury lamp, or a laser light source. The light outputted from the light source 134 passes through an optical integration system that is not shown, which reduces variation in the luminance distribution of the light, and the resultant light is separated by a color separation system that is not shown into color light components of red, green, and blue, which are the three primary colors of light. The red light component is incident on the red liquid crystal light valve 135R. The green light component is incident on the green liquid crystal light valve 135G. The blue light component is incident on the blue liquid crystal light valve 135B.

The liquid crystal light valves 135 are each formed, for example, of a liquid crystal panel in which a liquid crystal material is present between a pair of transparent substrates. The liquid crystal light valves 135 each have a rectangular pixel area 135a including a plurality of pixels 135p arranged in a matrix. In each of the liquid crystal light valves 135, drive voltage is applied to the liquid crystal material for each of the pixels 135p. When the light valve driving section 133 applies drive voltage based on the image signal to each of the pixels 135p, optical transmittance based on the drive voltage is set at the pixel 135p. The light outputted from the light source 134 is modulated when passing through the image area 135a and forms an image based on the image signal on a color light basis. The liquid crystal light valves 135 are an example of a light modulator.

The color images are combined with one another by a light combining system that is not shown for each of the pixels 135p to form a color image. The color image is projected via the projection system 136.

The camera 14 generates captured image data by capturing an image of the imaging area R2. The camera 14 includes an optical system, such as a lens, and an imaging device that converts light collected by the optical system into an electric signal. The imaging device is, for example, a CCD (charge coupled device) image sensor that receives light that belongs to the infrared region and the visible light region. The imaging device is not limited to a CCD image sensor and may instead, for example, be a CMOS (complementary metal oxide semiconductor) image sensor that receives light that belongs to the infrared region and the visible light region.

The camera 14 may include a filter that blocks part of the light to be incident on the imaging device. For example, when the imaging device is caused to receive infrared light, the camera 14 may be so configured that a filter that primarily transmits light that belongs to the infrared region is disposed in front of the imaging device.

The camera 14 may be provided in the projector 1. The camera 14 may instead be provided as a separate component external to the projector 1, and the camera 14 may be connected to the projector 1 via a wired or wireless interface that allows data transmission and reception.

When the camera 14 performs imaging using visible light, the camera 14 captures, for example, an image of the image projected on the whiteboard WB and an image of the object P located in the imaging area R2. The captured image data generated when the camera 14 performs imaging using visible light is hereinafter referred to as "visible light captured image data D1." The visible light captured image data D1 is used to perform calibration, which will be described later, recognize the object P, and track the object P.

When the camera 14 performs imaging using infrared light, the camera 14 generates captured image data representing, for example, reflected light reflected off the object P out of the infrared light outputted from the light output apparatus 3. The captured image data generated when the camera 14 performs imaging using infrared light is hereinafter referred to as "infrared light captured image data." The infrared light captured image data is used to evaluate whether or not the object P has touched the whiteboard WB.

The storage 15 is a recording medium readable by the processing section 16. The storage 15 is formed, for example, of a nonvolatile memory and a volatile memory. Examples of the nonvolatile memory may include a read only memory (ROM), an erasable programmable read only memory (EPROM), and an electrically erasable programmable read only memory (EEPROM). Examples of the volatile memory may include a RAM.

The storage 15 stores a control program 151 executed by the processing section 16 and a variety of data 152 used by the processing section 16. The data 152 includes calibration image data representing a calibration image. The calibration image has marks each having a shape set in advance, and the marks are arranged at certain intervals. The data 152 further includes an association table shown in FIG. 5 by way of example.

The processing section 16 is formed, for example, of a single processor or a plurality of processors. As an example, the processing section 16 is formed of a single central processing unit (CPU) or a plurality of CPUs. Part or entirety of the functions of the processing section 16 may be achieved by a circuit, such as a digital signal processor (DSP), an application specific integrated circuit (ASIC), a programmable logic device (PLD), and a field programmable gate array (FPGA). The processing section 16 concurrently or successively carries out a variety of processes.

The processing section 16 reads the control program 151 from the storage 15 and executes the control program 151 to function as an acquirer 160, an action controller 161, a recognizer 162, and a display controller 163.

The acquirer 160 acquires captured image data generated when the camera 14 provided in the projector 1 captures an image of the imaging area R2. When the camera 14 is provided as a separate component external to the projector 1, the acquirer 160 acquires the captured image data from the camera 14 via a wired or wireless interface that allows data transmission and reception. The acquirer 160 acquires the visible light captured image data D1 and the infrared light captured image data.

The action controller 161 controls, for example, a variety of actions of the projector 1. For example, the action controller 161 performs calibration. The calibration is the process of associating coordinates in the frame memory 132 with coordinates in the captured image data. The coordinates in the frame memory 132 correspond to a position on the image projected on the whiteboard WB. Associating the position in the frame memory 132 with the position in the captured image data allows, for example, identification of a portion corresponding to the position where the object P has touched the whiteboard WB out of the image projected on the whiteboard WB.

The calibration will be described below.

The action controller 161 reads the calibration image data from the storage 15. The action controller 161 may generate the calibration image data in accordance with the control program 151. The action controller 161 provides the image processing section 131 with the calibration image data to cause the projection section 13 to project the calibration image, which has marks each having a shape set in advance and arranged at certain intervals, on the whiteboard WB.

The action controller 161 subsequently causes the camera 14 to capture the calibration image formed with visible light and causes the camera 14 to generate the visible light captured image data D1. The action controller 161 subsequently causes the acquirer 160 to acquire the visible light captured image data D1. The action controller 161 detects the marks expressed in the visible light captured image data D1 and identifies the position of the center of gravity of each of the marks as the coordinates of the mark.

The action controller 161 associates the coordinates of each of the marks detected from the visible light captured image data D1 with the coordinates of the mark in the frame memory 132. Based on the association operation, the action controller 161 generates calibration data that associates the coordinates in the captured image data with the coordinates in the frame memory 132.

The calibration has been described.

The recognizer 162 recognizes the object P located in the recognition area R1, that is, the object P placed on the tray 2 based on partial data D2 representing an image of the recognition area R1 out of the visible light captured image data D1 acquired by the acquirer 160 after the calibration. That is, without use of partial data representing an image of the area different from the recognition area R1 out of the visible light captured image data D1, the recognizer 162 uses the partial data D2 representing the image of the recognition area R1 to recognize the object P located in the recognition area R1. The partial data D2 representing the image of the recognition area R1 is an example of first partial data, and the partial data representing the image of the area different from the recognition area R1 is an example of second partial data.

Figures 4, 5:
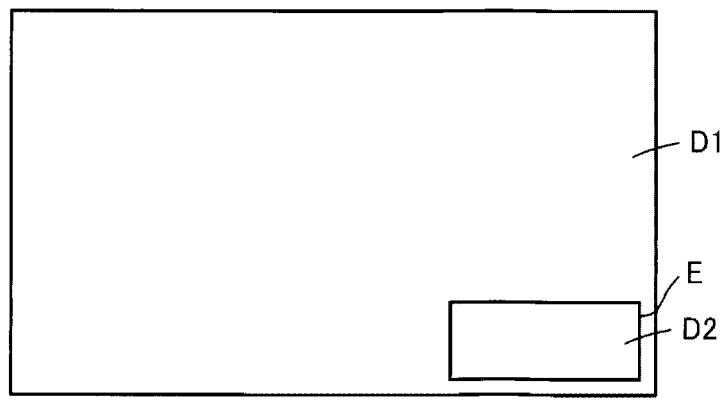
FIG. 4 shows an example of visible light captured image data.
FIG. 5 shows an example of an association table.

FIG. 4 shows an example of a portion E, where the partial data D2 representing the image of the recognition area R1 is present out of the visible light captured image data D1. The user sets the portion E in advance by operating the operation section 11 or the remote control. Instead, the projector 1 may automatically set the portion E. For example, an identification mark may be imparted to the tray 2, and the action controller 161 may detect the identification mark contained in the visible light captured image data and set a predetermined area the position of which is identified with respect to the identification mark as the recognition area R1.

The recognizer 162 recognizes, for example, the type of the object P located in the recognition area R1 based on the partial data D2, in detail, based on the feature of the object P expressed in the partial data D2. The type of the object P means, for example, the type that allows a person to recognize the object P. For example, there are a variety of forms of the black pen for writing a black line, and a person recognizes each of the variety of forms as a black pen for writing a black line, in detail, an object classified into the type representing a black pen for writing a black line.

The recognizer 162 recognizes a black pen in any of the variety of forms for writing a black line as a first writing tool having the function of writing a black line. The recognizer 162 therefore recognizes the black pen P1 as the first writing tool. The function of writing a black line is an example of a first function. The first writing tool is an example of a first pointing element. The first function is not limited to the function of writing a black line and may instead, for example, be the function of writing a dotted line.

The recognizer 162 recognizes a whiteboard eraser in any of a variety of forms as an eraser having the function of erasing a line displayed via the projection section 13 on the whiteboard WB. The recognizer 162 therefore recognizes the whiteboard eraser P2 as the eraser. The function of erasing a line displayed via the projection section 13 on the whiteboard WB is an example of a second function. The eraser is an example of a second pointing element. The second function is not limited to the function of erasing a line displayed via the projection section 13 on the whiteboard WB and may instead, for example, be the function of erasing only a line written by using the first function. It is, however, noted that the second function differs from the first function.

The recognizer 162 is achieved by a learning model having learned the relationship between the partial data D2 representing the image of the recognition area R1 where the object P is present and the type of the object P.

The learning model is a statistic model, in detail, a function block achieved by the processing section 16 and generates an output B according to an input A. For example, a neural network, typically, a deep neural network is used as the learning model. The learning model is achieved in the processing section 16 by the combination of a program that causes the processing section 16 to perform computation that identifies the output B from the input A, for example, a program module that forms artificial intelligence software and a plurality of coefficients K applied to the computation.

The plurality of coefficients K of the learning model are optimized by in-advance mechanical learning using a plurality of sets of teacher data that associate the input A with the output B. That is, the learning model is a statistic model having learned the relationship between the input A and the output B.

The learning model performs computation to which the plurality of coefficients K identified by the learning and a predetermined response function are applied on an unknown input A to generate a reasonable output B with respect to the input A based on a tendency extracted from the plurality of sets of teacher data, specifically, based on the relationship between the input A and the output B in the plurality of teacher data.

The recognizer 162 formed of the learning model uses the partial data D2, which represents the image of the recognition area R1 where the object P is located, as the input A and uses the type the object P as the output B.

For example, the recognizer 162 performs the learning by using a plurality of sets of teacher data that are the combinations of data representing the first writing tool as the type of the object P and the partial data D2 representing the first writing tool and a plurality sets of teacher data that are the combinations of data representing the eraser as the type of the object P and the partial data D2 representing the eraser. The recognizer 162 further performs the learning by using a plurality of sets of teacher data that are the combinations of data representing the type that does not show the first writing tool as the type of the object P and the partial data D2 representing an object that is not the first writing tool and a plurality sets of teacher data that are the combinations of data representing the type that does not show the eraser as the type of the object P and the partial data D2 representing an object that is not the eraser. The recognizer 162 may instead perform the learning by using another type of the object P. The type of the object P may instead be the attribute of the object P.

The display controller 163 controls the projection section 13 based on the result of the recognition performed by the recognizer 162. For example, the display controller 163 causes the projection section 13 to project an image having undergone a process according to the result of the recognition of the object P. The display controller 163 includes a tracker 163a, a touch evaluator 163b, and an operation reflector 163c.

The tracker 163a tracks the object P recognized by the recognizer 162 to identify the position of the object P on the whiteboard WB. For example, the tracker 163a uses the visible light captured image data to track the object P.

The touch evaluator 163b evaluates whether or not the object P has touched the whiteboard WB. For example, the touch evaluator 163b evaluates whether or not reflected light reflected off the object P on the whiteboard WB out of the infrared light radiated from the light output apparatus 3 is present based on the infrared light captured image data and evaluates whether or not the object P has touched the whiteboard WB based on the result of the evaluation.

For example, when the infrared light captured image data shows that the reflected light reflected off the black pen P1 is present, the touch evaluator 163b determines that the black pen P1 has touched the whiteboard WB.

On the other hand, when the latest infrared light captured image data does not show that the reflected light reflected off the black pen P1 is present, the touch evaluator 163b determines that the black pen P1 has not touched the whiteboard WB.

When the touch evaluator 163b determines that the object P has touched the whiteboard WB, the operation reflector 163c causes the projection section 13 to project the image having undergone a process according to the result of the recognition of the object P. The "case where the touch evaluator 163b determines that the object P has touched the whiteboard WB" is hereinafter referred to as the "case where the object P has touched the whiteboard WB."

For example, when the object P has touched the whiteboard WB in a situation in which the object P is recognized as the first wiring tool, the operation reflector 163c first uses the calibration data to convert the position of the object P being tracked by the tracker 163a, that is, the coordinates of the object P in the visible light captured image data into the coordinates in the frame memory 132.

The operation reflector 163c subsequently causes the image processing section 131 to carry out the process corresponding to the first writing tool's function of writing a black line in the position having the coordinates of the object P in the frame memory 132, specifically, a first process of drawing a black line.

As described above, causing the process carried out by the image processing section 131 to be equal to the function of the first writing tool, in detail, the process carried out by using the function of the object P allows a user who is unfamiliar with the operation of the projector 1 to intuitively operate the projector 1 by using the object P.

Having carried out the first process, the image processing section 131 supplies the light valve driving section 133 with a first image signal representing a first image having undergone the first process. The projection section 13 therefore displays the first image on the whiteboard WB.

On the other hand, in a situation in which the object P is recognized as the eraser, and when the object P has touched the whiteboard WB, the operation reflector 163c first uses the calibration data to convert the position of the object P being tracked by the tracker 163a into the coordinates in the frame memory 132.

The operation reflector 163c subsequently causes the image processing section 131 to carry out the process corresponding to the eraser's function of erasing the line written on the whiteboard WB in the position having the coordinates of the object P in the frame memory 132, specifically, a second process of erasing the projected line.

Having carried out the second process, the image processing section 131 supplies the light valve driving section 133 with a second image signal representing a second image having undergone the second process. The projection section 13 therefore displays the second image on the whiteboard WB.

The operation reflector 163c uses the association table representing the association relationship between the type of the object P, which is the result of the recognition of the object P, and the process that the image undergoes to recognize the relationship between the result of the recognition of the object P and the process that the image undergoes. The association table is stored in the storage 15, as described above.

A4. Association Table

FIG. 5 shows an example of the association table.

The association table associates the type of the object P with the process that the image undergoes. As an example, the process of "drawing a black line" is associated with the first writing tool. The association table is set by the user's operation of the operation section 11 or the remote control. The association table is rewritable.

A5. Description of Action

Figure 6:
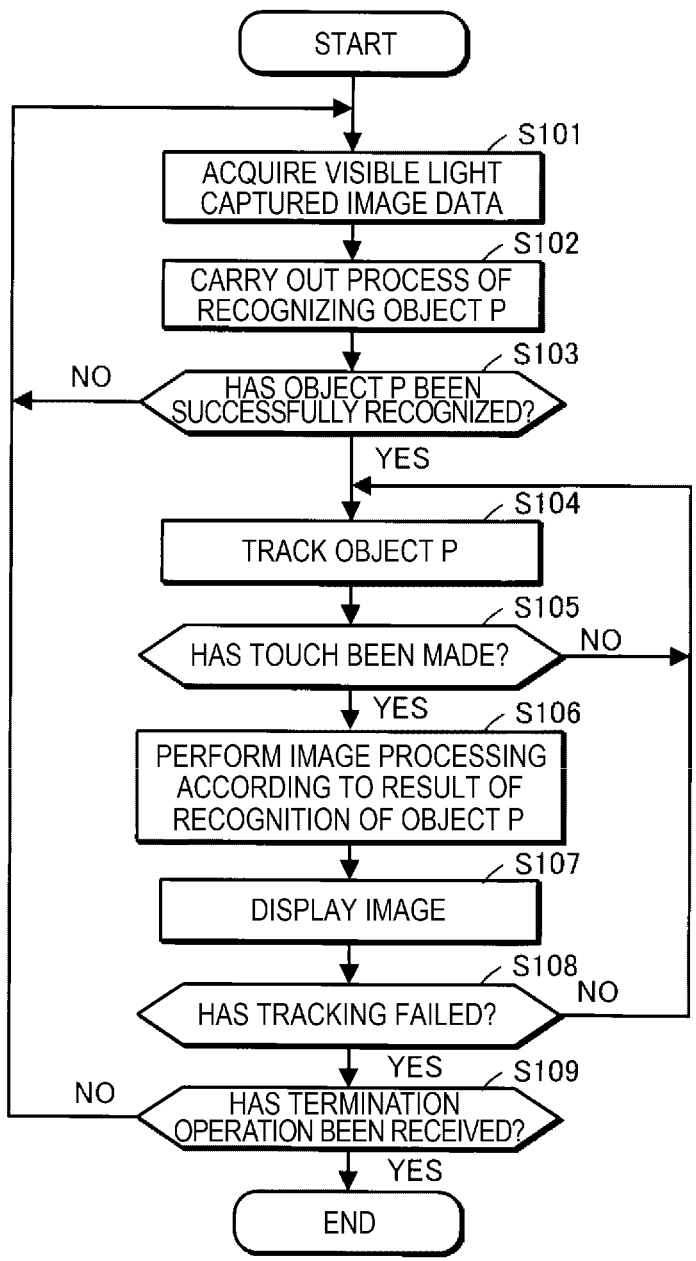
FIG. 6 is a flowchart for describing an example of the action of the projector.

FIG. 6 is a flowchart for describing an example of the action of the projector 1. It is assumed that the storage stores the association table shown in FIG. 5 for simplification of the description. It is further assumed that the calibration has been completed, and that the calibration data has been stored in the storage 15. It is further assumed that the projection section 13 has displayed an image showing a letter K on the whiteboard WB, as shown in FIG. 1. It is further assumed that the camera 14 is alternately generating the visible light captured image data and the infrared light captured image data.

To erase part of the letter K by moving the whiteboard eraser P2, which is an example of the object P, on the whiteboard WB, the user first places the whiteboard eraser P2 on the tray 2 and takes the hand off the whiteboard eraser P2. The whiteboard eraser P2 is not supported by the user but is located on the tray 2, that is, in the recognition area R1. The camera 14 captures an image of the whiteboard eraser P2 located in the tray 2 to generate the visible light captured image data representing an image in which the whiteboard eraser P2 is located in the recognition area R1.

In step S101, the acquirer 160 acquires the latest visible light captured image data from the camera 14.

In step S102, the recognizer 162 subsequently carries out the process of recognizing the object P present in the recognition area R1, that is, the whiteboard eraser P2 placed on the tray 2. The process of recognizing the object P present in the recognition area R1 is carried out by using the partial data D2 representing the image of the recognition area R1 out of the latest visible light captured image data with no use of the partial data representing the image of the area different from the recognition area R1. For example, the partial data representing the image of the area different from the recognition area R1 does not undergo evaluation of whether or not the object P is contained, determination of what the object P is when the object P is contained, or any other evaluation or determination, but only the partial data D2 may undergo evaluation of whether or not the object P is contained, determination of what the object P is when the object P is contained, and other types of evaluation and determination.

The recognizer 162 carries out the process described above to recognize the whiteboard eraser P2 on the tray 2 as an eraser having the function of erasing the line written on the whiteboard WB.

In step S103, it is evaluated whether or not the recognizer 162 has successfully recognized the object P in step S102. When the result of step S103 shows that the recognizer 162 has not successfully recognized the whiteboard eraser P2, for example, when the whiteboard eraser P2 has been placed at an end of the tray 2 and has fallen from the tray 2, the control returns to the process in step S101.

On the other hand, when the result of step S103 shows that the recognizer 162 has successfully recognized the object P on the tray 2, specifically, when the recognizer 162 has successfully recognized the whiteboard eraser P2 on the tray 2 as the eraser, the tracker 163a causes the acquirer 160 to acquire the latest visible light captured image data and tracks the object P, that is, the whiteboard eraser P2 based on the latest visible light captured image data in step S104. The tracker 163a tracks the object P to identify the position of the object P.

When the recognizer 162 has successfully recognized the object P, the action controller 161 may cause the projection section 13 to project a recognition result image showing the result of the recognition of the object P. Examples of the recognition result image may include an image showing the result of the recognition of the object P in the form of letters, for example, an image showing letters "Object on tray has been recognized as eraser." The recognition result image is not limited to the image described above and may, for example, be an image showing the result of the recognition in the form of a picture.

The user subsequently lifts the whiteboard eraser P2 from the tray 2 with a hand, causes the whiteboard eraser P2 to touch the whiteboard WB, and starts an action of erasing part of the letter K.

In step S105, the touch evaluator 163b subsequently causes the acquirer 160 to acquire the latest infrared light captured image data and evaluates whether or not the object P has touched the whiteboard WB, that is, the whiteboard eraser P2 has touched the whiteboard WB based on the latest infrared light captured image data.

When the touch evaluator 163b determines in step S105 that the whiteboard eraser P2 has not touched the whiteboard WB, the control returns to the process in step S104.

On the other hand, when the touch evaluator 163b determines in step S105 that the whiteboard eraser P2 has touched the whiteboard WB, the operation reflector 163c causes the image processing section 131 to perform the function according to the result of the recognition of the whiteboard eraser P2, which is the object P, specifically, image processing according to the function of the eraser in step S106.

In step S106, the operation reflector 163c first refers to the association table to identify the process associated with the eraser.

The operation reflector 163c subsequently uses the calibration data to convert the coordinates of the whiteboard eraser P2 in the latest visible light captured image data into the coordinates in the frame memory 132. The operation reflector 163c may instead use the calibration data to convert the coordinates of the touch position in the latest infrared light captured image data, that is, the coordinates of the whiteboard eraser P2 in the latest infrared light captured image data into the coordinates in the frame memory 132.

The operation reflector 163c subsequently causes the image processing section 131 to carry out the second process of erasing the line present in the position having the coordinates of the whiteboard eraser P2 in the frame memory 132. When the position having the coordinates of the whiteboard eraser P2 in the frame memory 132, which have been identified from the latest visible light captured image data, coincides with the position having the coordinates of the whiteboard eraser P2 in the frame memory 132, which have been identified from the latest infrared light captured image data, the operation reflector 163c causes the image processing section 131 to carry out the second process, whereas when the two positions do not coincide with each other, the operation reflector 163c may not cause the image processing section 131 to carry out the second process.

Having carried out the second process, the image processing section 131 supplies the light valve driving section 133 with the second image signal representing the second image having undergone the second process. Step S106 is thus completed.

In step S107, the projection section 13 subsequently displays the second image carried by the second image signal on the whiteboard WB.

In step S108, the action controller 161 subsequently evaluates whether or not the tracker 163a has failed to track the whiteboard eraser P2. The failure in the tracking means that the tracker 163a has lost the whiteboard eraser P2.

When the tracker 163a has not failed to track the whiteboard eraser P2 in step S108, the control returns to the process in step S104.

On the other hand, when the tracker 163a has failed to track the whiteboard eraser P2 in step S108, for example, when the user has dropped the whiteboard eraser P2 onto the floor and the whiteboard eraser P2 has gone out of the imaging area R2, the action controller 161 evaluates in step S109 whether or not the operation section 11 or the receiver 12 has received termination operation.

When the operation section 11 or the receiver 12 has not received the termination operation in step S109, the control returns to the process in step S101.

On the other hand, the operation section 11 or the receiver 12 has received the termination operation in step S109, the entire process shown in FIG. 6 is terminated.

A6. Summary of First Embodiment

The display method and the display apparatus according to the present embodiment described above include the following aspects.

The projection section 13 displays an image on the whiteboard WB. The acquirer 160 acquires captured image data generated by capturing an image of the imaging area R2 containing the recognition area R1. The recognizer 162 recognizes the object P located in the recognition area R1 by using the partial data D2 representing the image of the recognition area R1 out of the captured image data with no use of the partial data representing the image of the area different from the recognition area R1.

When the object P is recognized as the first writing tool, and the object P moves from the recognition area R1 onto the whiteboard WB, the display controller 163 controls the projection section 13 to cause it to display the first image on the whiteboard WB, the first image having undergone the process of drawing a black line, which corresponds to the function of the first writing tool, in the portion according to the position of the object P on the whiteboard WB. Therefore, when the object P is the first writing tool, a black line is displayed in the position where the first writing tool has touched the whiteboard WB.

When the object P is recognized as the eraser, and the object P moves from the recognition area R1 onto the whiteboard WB, the display controller 163 controls the projection section 13 to cause it to display the second image on the whiteboard WB, the second image having undergone the process of erasing the line located in the portion according to the position of the object P on the whiteboard WB. Therefore, when the object P is the eraser, the line present in the touch position where the eraser has touched the whiteboard WB is erased.

According to the aspect, The recognizer 162 recognizes the object P by using the partial data D2 representing the image of the recognition area R1 out of the captured image data with no use of the partial data representing the image of the area different from the recognition area R1. The amount of captured image data used to recognize the object P can therefore be reduced as compared with a configuration in which entire captured image data is used to recognize the object P. The processing burden required for the recognition of the object P can therefore be reduced.

Since the recognizer 162 recognizes a whiteboard eraser in any of a variety of forms as the eraser, another whiteboard eraser can be used as the eraser, for example, even when a dedicated whiteboard eraser initially contained in the projector system 1000 is lost.

Further, since processing that is likely to be suggested from the type of the object P is performed on an image containing the object P, even a user who is unfamiliar with the operation of the projector 1 can intuitively operate the projector 1 by using the object P.

The recognition area R1 is an area where the object P is located when the tray 2, which is an example of the support that supports the object P, supports the object P. The object P located in the recognition area R1 is therefore so contained in the captured image data, for example, that part of the object P is not hidden by a hand of the user who supports the object P. The recognizer 162 recognizes the object P by using the captured image data and therefore readily recognizes the object P as compared with the configuration in which captured image data representing the object P part of which is hidden, for example, by the user's hand is used to recognize the object P.

The support is the tray 2, which functions as a stand on which the object P is placed. The user can therefore allow the recognizer 162 to recognize the object P based on simple operation of placing the object P on the tray 2.

The support may be a hook from which the object P is hung directly or indirectly via a string or any other object. In this case, the user can allow the recognizer 162 to recognize the object P based on simple operation of hanging the object P from the hook.

The tracker 163a tracks the object P to identify the position of the object P on the whiteboard WB. Not only the position of the object P but a change in the position can therefore be recognized.

The captured image data is generated by the camera 14, the imaging area R2 contains the whiteboard WB, and the tracker 163a identifies the position of the object P on the whiteboard WB based on the captured image data. A captured image generated by the single camera 14 can therefore be used to recognize the object P and identify the position of the object P. The configuration can therefore be simplified as compared, for example, with a configuration in which a camera for recognition of the object P and a camera for identification of the position of the object P are separately provided.

B. Variations

Variations of the embodiment described above by way of example will be presented below by way of example. Two or more aspects arbitrarily selected from the following examples may be combined with each other as appropriate to the extent that the combined aspects do not contradict.

B1. First Variation

In the first embodiment, when the object P has a large number of functions, as in the case of a smartphone, it is desirable in the association table shown in FIG. 5 by way of example that the process associated with the type of the object P is limited to one process. In this case, the process associated with the object P having a large number of functions may be changed in accordance with the situation in which the object P is used. For example, since a smartphone has the function of erasing a letter inputted onto the screen, the process corresponding to the function of the eraser may be associated with the smartphone in the association table when no whiteboard eraser is present in the projection system and therearound.

B2. Second Variation

In the first embodiment and the first variation, the association of the type of the object P with a process in the association table is not limited to the example shown in FIG. 5 and can be changed as appropriate. For example, when a magnet for fixing a paper sheet or any other object onto the whiteboard WB is used as the type of the object P, the process of "displaying a display window in which the magnet is placed always in the frontmost plane" may be used as the process associated with the magnet.

B3. Third Variation

In the first embodiment and the first to second variations, the liquid crystal light valves 135 are used as an example of the light modulator, and the light modulator is not limited to liquid crystal light valves and can be changed as appropriate. For example, the light modulator may have a configuration using three reflective liquid crystal panels. The light modulator may still have a configuration using one liquid crystal panel, three digital mirror devices (DMDs), one digital mirror device, or any other component. When only one liquid crystal panel or one DMD is used as the light modulator, no members corresponding to the color separation system and the light combining system are required. In place of liquid crystal panels or DMDs, a configuration capable of modulating the light outputted from the light source 134 is employable as the light modulator.

B4. Fourth Variation

In the first embodiment and the first to third variations, when an FPD is used as the display apparatus in place of the projector 1, a touch panel may be used in place of the light output apparatus 3. Further, the FPD as the display apparatus may, for example, be an FPD incorporated in an electronic instrument, such as a tablet terminal and a smartphone, or an FPD used in an electronic blackboard or an electronic conference system.

What is claimed is:

1. A display method carried out by a display apparatus, the method comprising:
    acquiring captured image data generated by capturing an image of an imaging area containing a recognition area, the captured image data containing first partial data representing an image of the recognition area and second partial data representing an image of an area of the imaging area that is an area different from the recognition area;
    recognizing an object located in the recognition area by using the first partial data with no use of the second partial data;
    displaying a first image that underwent a first process on a display surface in a portion thereof according to a position of the object on the display surface when the object is recognized as a first pointing element having a first function and when the object moves from the recognition area onto the display surface, the first process associated with the first function; and
    displaying a second image that underwent a second process different from the first process on the display surface in a portion thereof according to the position of the object on the display surface when the object is recognized as a second pointing element having a second function different from the first function and when the object moves from the recognition area onto the display surface, the second process associated with the second function,
    wherein the imaging area comprises the display surface, and
    wherein the recognition area is outside of the display surface.

2. The display method according to claim 1,
    wherein the recognition area is an area where the object is located when a support that supports the object supports the object.

3. The display method according to claim 2,
    wherein the support is a stand on which the object is placed.

4. The display method according to claim 2,
    wherein the support is a hook from which the object is hung.

5. The display method according to claim 1,
    wherein the position of the object on the display surface is identified by tracking the object.

6. The display method according to claim 1, wherein
    wherein the captured image data is generated by a camera, and
    the position of the object on the display surface is identified based on the captured image data.

7. A display apparatus comprising:
    a display section that displays an image on a display surface; and
    at least one processor,
    wherein the at least one processor is configured to acquire captured image data generated by capturing an image of an imaging area containing a recognition area, the captured image data containing first partial data representing an image of the recognition area and second partial data representing an image of an area of the imaging area that is an area different from the first area;
    wherein the at least one processor is configured to recognize an object located in the recognition area by using the first partial data with no use of the second partial data; and
    wherein the at least one processor is configured to control the display section based on a result of the recognition,
    wherein the at least one processor is configured to control the display section to cause the display section to display a first image that underwent a first process on the display surface in a portion thereof according to a position of the object on the display surface when the object is recognized as a first pointing element having a first function and when the object moves from the recognition area onto the display surface, the first process associated with the first function,
    wherein the at least one processor is configured to control the display section to cause the display section to display a second image that underwent a second process different from the first process on the display surface in a portion thereof according to the position of the object on the display surface when the object is recognized as a second pointing element having a second function different from the first function and when the object moves from the recognition area onto the display surface, the second process associated with the second function,
    wherein the imaging area comprises the display surface, and
    wherein the recognition area is outside of the display surface.

* * * * *